UNITED STATES PATENT OFFICE.

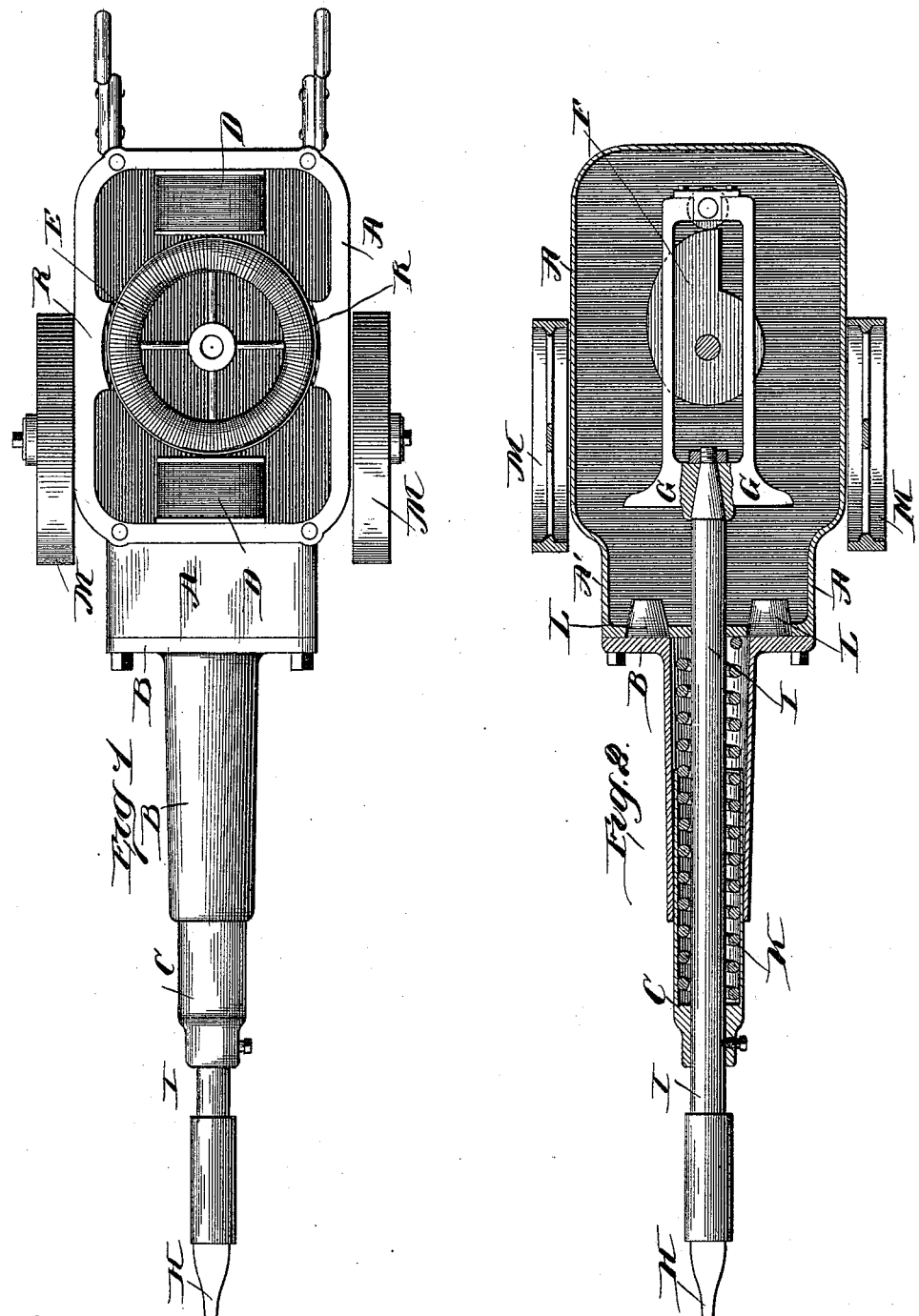

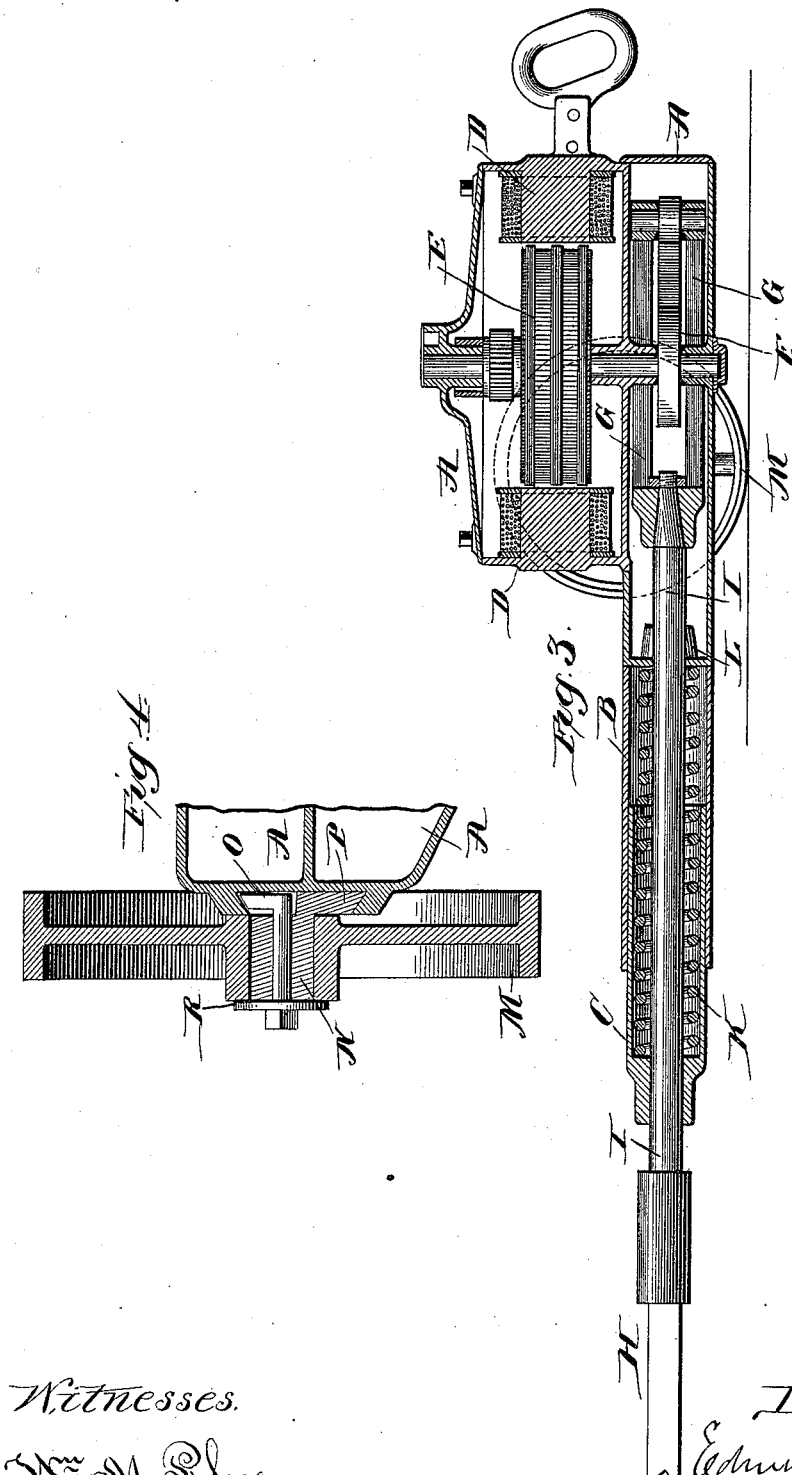

EDMUND C. MORGAN, OF CHICAGO, ILLINOIS.

ELECTRIC COAL-MINING MACHINERY.

SPECIFICATION forming part of Letters Patent No. 494,587, dated April 4, 1893.

Application filed July 6, 1891. Serial No. 398,375. (No model.)

*To all whom it may concern:*

Be it known that I, EDMUND C. MORGAN, a citizen of the United States, residing at Chicago, in the county of Cook and State of Illinois, have invented new and useful Improvements in Electrical Coal-Mining Machinery, of which the following is a specification.

This invention relates to improvements in electrical coal mining machinery, and is particularly designed as an improvement on the construction embraced in my application, Serial No. 365,039, filed September 15, 1890.

The invention consists in the construction and arrangement hereinafter described and claimed.

Like letters refer to the same parts in the several figures of the drawings, in which:

Figure 1, is a plan view of the invention with the cover of the case removed so as to show the parts within the case. Fig. 2, is a horizontal and longitudinal section taken on a line just above the cam. Fig. 3, is a vertical and longitudinal section; and, Fig. 4, is a detail view in section of the manner of connecting the wheels to the machines.

The frame A of the machine is of any suitable shape and material, and is arranged to form a box or case for inclosing most of the working parts of the device. The frame may be made in one or more sections, as shown in the drawings so that it may be taken apart and access given to the internal machine. Within this case is arranged a multi-polar motor of any well known construction. In the present instance this multi-polar motor is composed of two field magnets D, D, and a circular armature, E, arranged between such magnets and the pole pieces of the magnets being cast in one piece with the frame, and the coils afterward placed upon the same. In the arrangement shown, which I prefer, two of the poles are arranged in front of the magnets on opposite sides of the armature and the other two poles are removed from the coils and formed as a part of the frame at right angles to such coils as shown at R. R. As is well understood by electricians, a multipolar motor develops more power for the same rate of speed than a bi-polar motor because it has more poles to energize the armature. The vertical axis or shaft of the armature is journaled in the case and has rigidly secured to it near its lower end a cam F which is caused by the rotation of the armature to revolve in a horizontal plane. The pick H is coupled to a tool holder I, which is extended backward into the case and connected by a nut and bolt or other suitable connection to a yoke G which latter may carry a friction roller at its rear end. The cam I plays in this yoke and operates against the friction rollers just mentioned. This tool holder is rigidly secured to a tubular sleeve C which partially incloses a spring K. Detachably bolted to the casing is an extension B, also of tubular form and surrounds and incloses that portion of the spring not within the sleeve C, and also partially incloses and serves as a guide for such sleeve. The spring at one end bears against the frame and its other end rests against the outer shoulder of the tubular sleeve.

Elastic buffers, L, project within the frame in the path of the yoke and serve to arrest the progress of such yoke at the extremity of its stroke. These buffers are inserted through conical apertures in the front of the casing, and the flanged ends of the extension B are afterward placed behind them and firmly bolted to the casing so as to secure the buffers in place.

The machine is mounted upon wheels, and I have devised a new mechanism to enable such wheels to be longitudinally adjusted with reference to such machine. The sides of the frame A are provided with dovetail grooves, and the wheels M have short axes N which upon their inner projecting sides are formed in dovetail shape and fit in the grooves of the casing. These dovetail flanges are designated by the letter P; each of which has a recess to one side formed for the reception of a beveled toe O secured to a bolt R which latter passes through the bearing of the wheels and is secured thereto by a nut and washer in the usual way. By tightening the nuts on the outer end of these bolts their beveled angular portions O are caused to bear against a point on the inner beveled sides of the grooves in the casings and thus fix the bearings for the wheels at the point at which this adjustment is made. By loosening the nut, it will be seen that the wheel may be moved longitudinally in every direction.

The general operation of the machine is as follows: By using a multipolar motor the armature which drives the tool may be revolved at a low rate of speed compared to that of armatures of the usual electric motors employed in this connection, with an equal or greater amount of power resulting; whereby the usual low speed gearing necessary in ordinary motors when used in connection with mining tools may be dispensed with, and the machine thereby simplified and rendered more efficient. The cam being upon the same shaft with the armature has the movement of the latter imparted to it, and as such cam revolves within the yoke it strikes the friction roller therein and forces the yoke backward, and therefore draws back the tool holder, pick and sleeve against the action of the spiral spring and correspondingly compresses the latter. As soon as the point of the cam passes the friction roller the force which compressed the spring is withdrawn and the spring immediately expands to its normal position and throws forward the sleeve, tool holder and pick, thus causing the latter to strike a violent blow against the coal. The rubber buffers receive the forward thrust of the yoke and relieve the frame of a large proportion of the jar which otherwise would result. As before suggested the wheels can be moved back or forth in the frame and set at the proper point.

The machine thus constructed is very simple and nevertheless very effective in its operation.

It is obvious that many variations may be made in the details of this invention without departing from the spirit thereof, and I, therefore, do not wish to be understood as confining myself to the exact construction shown and described.

What I claim, and desire to secure by Letters Patent, is—

1. The combination of an electric motor, a mining tool, and mechanism connecting the same with the motor whereby the tool is drawn backward, and a spring between the tool and the frame for thrusting the former forward, elastic buffers arranged in apertures in the forward part of the frame, and an extension inclosing the spring and provided with flanges or a base plate detachably secured to the frame whereby the buffers are held in place, substantially as and for the purpose set forth.

2. In a mining machine the combination with mechanism for driving the tool a frame having apertures, elastic buffers in such apertures, and an extension or sleeve inclosing the spring and provided with flanges or a base plate detachably secured to the frame whereby the buffers are held in place, substantially as and for the purpose set forth.

3. In a mining machine the combination of a multi-polar electric motor having a revolving armature, a cam secured to the axis of such armature a mining tool connected to the cam so as to be drawn backward thereby, and a spring arranged between the tool and the frame for thrusting the tool in the other direction, substantially as and for the purpose set forth.

4. In a mining machine, the combination of a multipolar electric motor, having a revolving armature, a cam secured to the axis of such armature, a yoke connected to the mining tool and embracing the cam so as to be drawn backward by the latter and a spiral spring between the mining tool and the frame for thrusting forward the tool after it has been given its full backward stroke by the cam, substantially as and for the purpose set forth.

5. In a mining machine the combination of a frame having dovetailed grooves longitudinally thereof, wheels whose axes are provided with dovetail flanges and adjusting and securing bolts having toes with beveled faces, whereby the wheels may be moved longitudinally of the frame and set at any desired point, substantially as and for the purpose set forth.

EDMUND C. MORGAN.

Witnesses:
J. L. GERRY,
WM. S. CAMERON.